United States Patent
Agarwal et al.

(10) Patent No.: US 10,061,792 B2
(45) Date of Patent: Aug. 28, 2018

(54) TIERED INDEX MANAGEMENT

(71) Applicants: Anant Agarwal, New Delhi (IN); Steven A. Kirk, Chelmsford, MA (US); Blaine French, Concord, MA (US); Nandan Marathe, Pune (IN); Shailesh Mungikar, Pune (IN); Kaushal Mittal, Pune (IN)

(72) Inventors: Anant Agarwal, New Delhi (IN); Steven A. Kirk, Chelmsford, MA (US); Blaine French, Concord, MA (US); Nandan Marathe, Pune (IN); Shailesh Mungikar, Pune (IN); Kaushal Mittal, Pune (IN)

(73) Assignee: Sybase, Inc., Dublin, CA (US)

( * ) Notice: Subject to any disclaimer, the term of this patent is extended or adjusted under 35 U.S.C. 154(b) by 276 days.

(21) Appl. No.: 14/145,453

(22) Filed: Dec. 31, 2013

(65) Prior Publication Data
US 2015/0186453 A1     Jul. 2, 2015

(51) Int. Cl.
*G06F 17/30* (2006.01)

(52) U.S. Cl.
CPC .. *G06F 17/30336* (2013.01); *G06F 17/30327* (2013.01)

(58) Field of Classification Search
CPC ........... G06F 17/30625; G06F 17/2205; G06F 17/30312; G06F 17/30327; G06F 17/30336
See application file for complete search history.

(56) References Cited

U.S. PATENT DOCUMENTS

| | | | | |
|---|---|---|---|---|
| 4,956,774 A | * | 9/1990 | Shibamiya | G06F 17/30474 707/999.002 |
| 5,202,986 A | * | 4/1993 | Nickel | G06F 17/30955 707/999.003 |
| 5,721,898 A | * | 2/1998 | Beardsley | G06F 3/0601 707/999.003 |
| 6,516,320 B1 | * | 2/2003 | Odom | G06F 17/30955 707/747 |
| 6,553,370 B1 | * | 4/2003 | Andreev | G06F 17/30864 707/999.003 |
| 2003/0204513 A1 | * | 10/2003 | Bumbulis | G06F 17/30327 707/999.1 |
| 2004/0015478 A1 | * | 1/2004 | Pauly | G06F 17/30327 707/999.001 |
| 2004/0103081 A1 | * | 5/2004 | Gaur | G06F 17/30961 707/999.002 |
| 2012/0221577 A1 | * | 8/2012 | Fuh | G06F 17/30312 707/741 |
| 2014/0025708 A1 | * | 1/2014 | Finis | G06F 17/30327 707/797 |
| 2014/0280363 A1 | * | 9/2014 | Heng | G06F 17/30289 707/802 |

* cited by examiner

*Primary Examiner* — Carol Choi
(74) *Attorney, Agent, or Firm* — Sterne, Kessler, Goldstein & Fox, P.L.L.C.

(57) ABSTRACT

Disclosed herein are methods for retrieving data from a database. An embodiment operates searching for a key in a first index. The method determines that the searching will require a storage access request and issues the storage access request. The method continues searching for the key in a second index.

18 Claims, 13 Drawing Sheets

TIERED INDEX MANAGEMENT

BACKGROUND

Database systems typically maintain their data in a sorted index in order to efficiently find and retrieve information. When inserting new data into an existing database, the database places the new data in the appropriate location to maintain the sorted index. The insertion operation needs to read existing data to determine where to insert the new data. The time it takes to perform this sorted insert operation depends on the size of the index. As the index grows, the database must read and move more data in order to maintain the sorted index. As a result, an insert operation takes longer as the database grows larger.

Another challenge in maintaining large indices is balancing between densely packing index data and allowing empty spaces for faster incremental inserts. A denser storage requires more splitting during an incremental insert, while a sparser storage leads to more disk I/O reads during querying.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for storing data in a database using a tiered index architecture.

A segmented index approach that maintains separate indices over different data ranges can be used to overcome the challenges mentioned above. However, this approach may require accurate data model forecasting, because if the data range partitioning is not accurate, segment size can differ substantially and individual segments may become a bottleneck.

Index tiering is an alternate strategy to maintaining a monolithic sorted index while enabling reduced costs of incremental index proportional to input size. It is also allows keeping the data packing in an index as dense as possible in order to keep data I/O as low as possible.

The primary challenge posed by a tiered index architecture for query execution is in aggregating data from multiple sub-indexes. The same data or values could be present in multiple sub-indexes and different techniques are required for efficient query access.

Generally, inserting data into a sorted database index may require inspecting data in the index to determine where to insert the new data. As the database receives more data and the index grows, inspecting the index takes a proportionally longer time. In a worst case scenario, an insert operation may require reading the entire index data. According to an embodiment, the tiered index architecture described herein divides an index into multiple tiers. Each tier is sorted, but data across tiers can remain unsorted. The system can then insert new data into one of the tiers. Because the individual tiers are smaller than the totality of the index, the architecture can reduce the time required to insert new data. In an embodiment, inserting data into fixed size tiers can also make the time required for an insert operation proportional to the size of the load, instead of the size of the database. The system can also keep data packing in the index as dense as possible in order to keep data I/O as low as possible.

Figure 1:
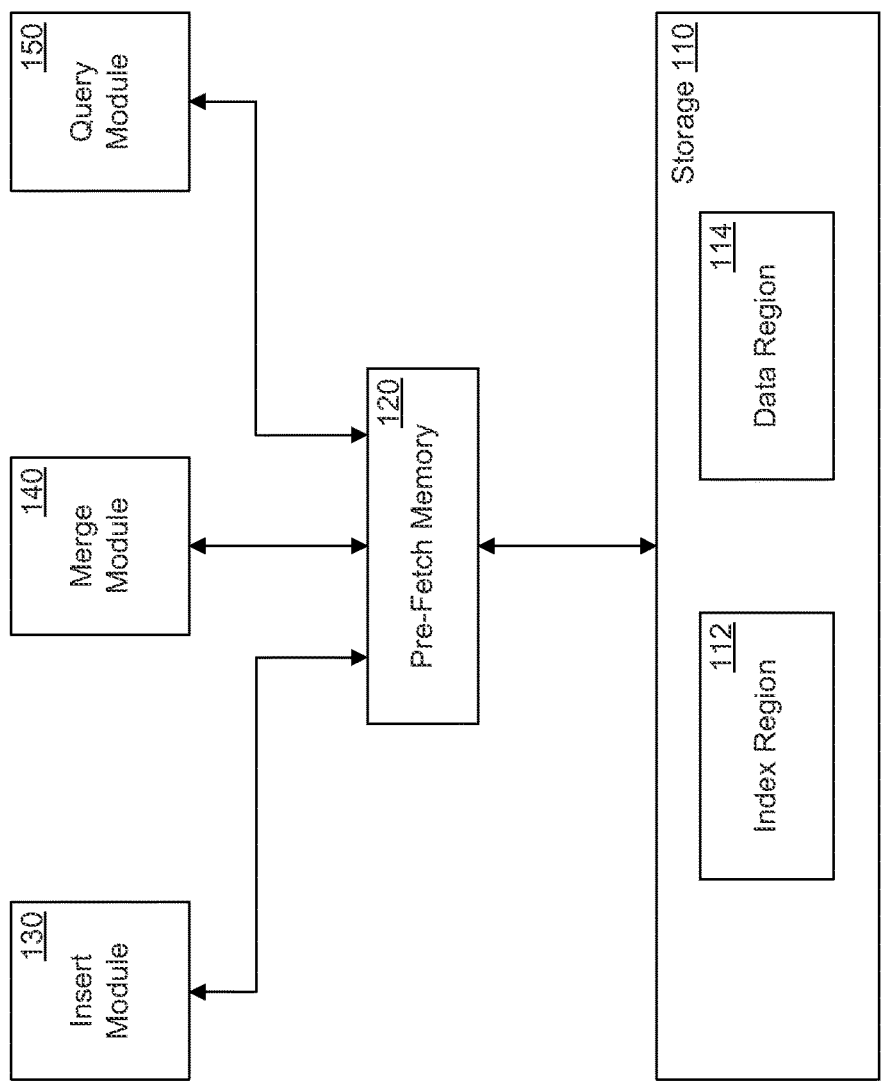
FIG. 1 is a block diagram of a database system that includes a tiered index architecture, according to an example embodiment.

FIG. 1 is a block diagram of a database system 100 that includes a tiered index architecture, according to an example embodiment. Database system 100 includes a storage unit 110, a prefetch memory 120, an insert module 130, a merge module 140 and a query module 150.

Storage unit 110 contains a tiered index region 112 and a data region 114. Tiered index region 112 contains a tiered index including one or more sorted indices, also called tiers. Data region 114 contains data pointed to by elements in the tiered index. In an embodiment, the index region 112 and the data region 114 are not separated, and the tiered index contains the stored data.

Prefetch memory 120 can access data from storage for querying and manipulation during an insert. In an embodiment, the data may be managed in a Least Recently Used (LRU) fashion and can be moved back to storage (if dirtied) when not accessed for a long time or committed.

Insert module 130 inserts data into the database system and maintains the tiered structure of the index, as further explained below.

Merge module 140 performs data merge and sorting operations to maintain the tiered architecture, as further explained below.

Query module 150 retrieves data from the database system, as further explained below.

In order to improve insertion time, insert module 130 can insert data into one of the tiers alone. The tier may not change across multiple or all insert operations. In an embodiment, insert module 130 inserts data into the smallest tier, which is referenced herein as tier0. In an embodiment, insert module 130 can limit the size of tier0 to fit entirely in prefetch memory 120. Data can flow periodically towards a lower tier, i.e., tier1. For example, merge module 140 can move data from tier0 to tier1 after a certain number of data inserts or after a tier0 reaches a threshold size. Alternatively, merge module can move a portion of the data during each insert operation.

Merging two tiers can become costly as the lower tier becomes larger. Therefore, merge module 140 can split the lower tier itself into multiple tiers. For example, as each tier reaches a threshold size, merge module 140 can break down the lowest tier into two tiers. In an embodiment, in order to keep the amount of tiers in check as more data is inserted, merge module 140 can size each tier differently. For example, tier0 can be the smallest, which would retain the advantage of an efficient insert action. Merge module 140 can make each lower tier larger by a certain ratio compared to the previous tier, i.e., the threshold size of each subsequent tier is larger. In an embodiment, when a given tier grows beyond its threshold size, merge module 140 moves data from the tier to a lower tier.

Figure 2:
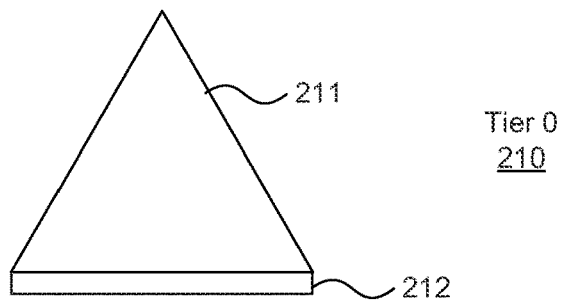
FIG. 2 is a diagram of a tiered index architecture, according to an example embodiment.
Figure 2:
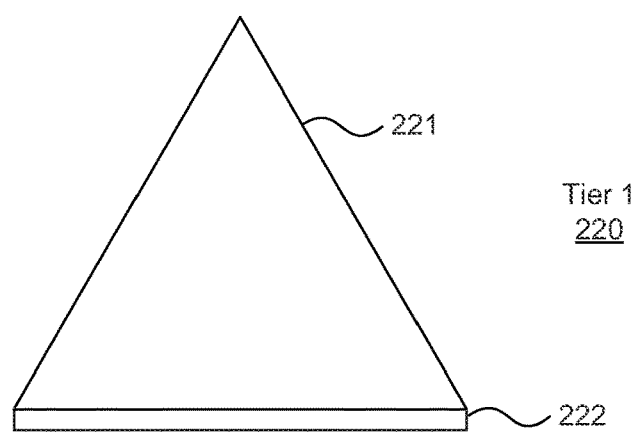
Figure 2:
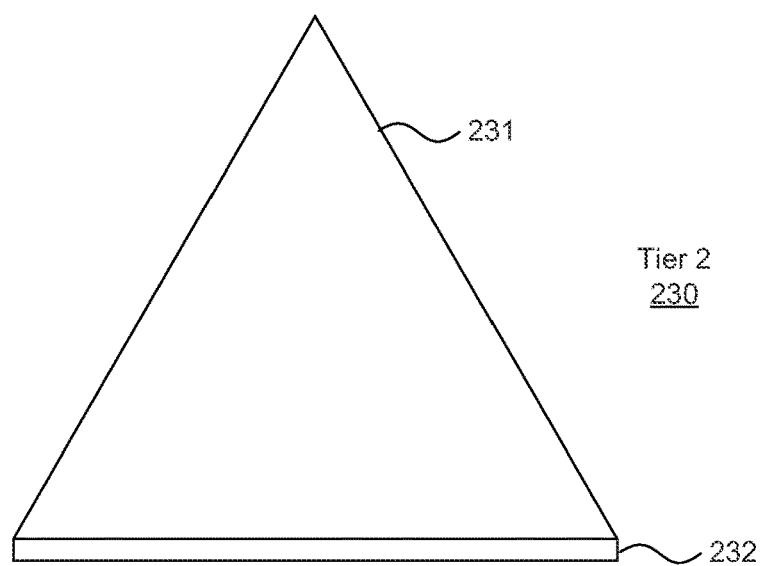

FIG. 2 is a diagram of a tiered index architecture 200, according to an example embodiment. In the depicted example, tiered index includes a tier 210 (tier0), a tier 220 (tier1) and a third tier 230 (tier2). Tier 210 includes a sorted set of keys 211 and a row space 212 (or rowset) holding those keys. Likewise, tier 220 includes a sorted set 221 and a rowset 222, and tier 230 includes a sorted set 231 and a rowset 232.

In an embodiment, every tier can comprise a sorted set of keys built as a tree data structure. In an embodiment, the tree data structure is a B-tree, details of which will be understood by those skilled in the relevant arts. In an embodiment, each lower tier is larger than the previous tier by, for example, a fixed ratio.

In an embodiment, merge module 140 adapts the sizes of tiers based on the size of insert loads as they come along over time. For example, the initial size of tier0 can be configured based on a reasonable estimate of the expected sizes of insert loads. In an embodiment, the size of tier0 is based on the very first insert load. As insert loads arrive, the merge module 140 can continually calibrate the tier threshold size for each tier. In an embodiment, tier0 is kept small enough so that it can be read entirely in memory.

For example, in a certain usage scenario, the first few loads can be large (e.g., 1 billion rows), but may then be followed by periodic medium sized incremental loads (e.g., 1 million rows) interspersed with trickle loads (e.g., individual values or 100s of rows). Merge module 140 can learn from the usage pattern in order to improve performance, and dynamically tune the sizing of tiers. At the start of each incremental load, if the incremental load size is too small compared to the previous load pattern, merge module 140 can move tier0 data (or merge) with the lower tier. Merge module 140 can determine that a load is too small based on the tier threshold. Merge module 140 may ignore trickle loads when updating dynamic sizing parameters, in order to prevent them from unduly skewing the averages.

The dynamic sizing of tiers can be controlled using various factors, such as, for example, data blocks occupied by the tiers, the rows in each tier, number of distinct keys held by each tier, etc.

In an embodiment, since all inserts are done in tier0, the sub-indices in lower tiers do not need to have any padding in the tree pages to allow for incoming keys. In this example, the lower tiers can be kept fully densely packed, achieving improved compression.

In an embodiment where the database stores non-unique indices, insert module 130 can achieve distinct count maintenance by comparing input keys against the keys in the biggest tier. However, incoming keys may be sparse and probing each key may result in reading almost the entire biggest tier. In an embodiment, merge module 140 limits tier0 size to a certain fraction of the keys present in the biggest tier in the index. In such an example, the other tier size could still be dictated by other factors mentioned above (e.g., data blocks, rows, distinct keys in each tier, etc.). Another way to limit the probing volume would be to probe a limited number of incoming keys instead of all and project the distinct keys statistically. All the keys in the middle tiers may be probed against the biggest tier during the merge action.

In order to maintain the temporal property of data flow, in an embodiment, insert module 130 can insert all data into tier0 and merge module 140 can propagate the data into lower tiers as more data is pushed into the index. In an embodiment, any updates to the data are performed as a delete operation followed by an insertion. In this example, since all inserts go to tier0, the temporal property is maintained.

In an embodiment, merge module 140 can merge data from a tier into the next tier by maintaining two sub-indices in each tier. An incremental sub-index can contain data pushed from the previous tier and which is to be merged into the current tier. Under this scheme, whenever a tier grows above a threshold, the entire tier can be pushed to an immediately lower tier as an incremental sub-index of that tier.

Figure 3A:
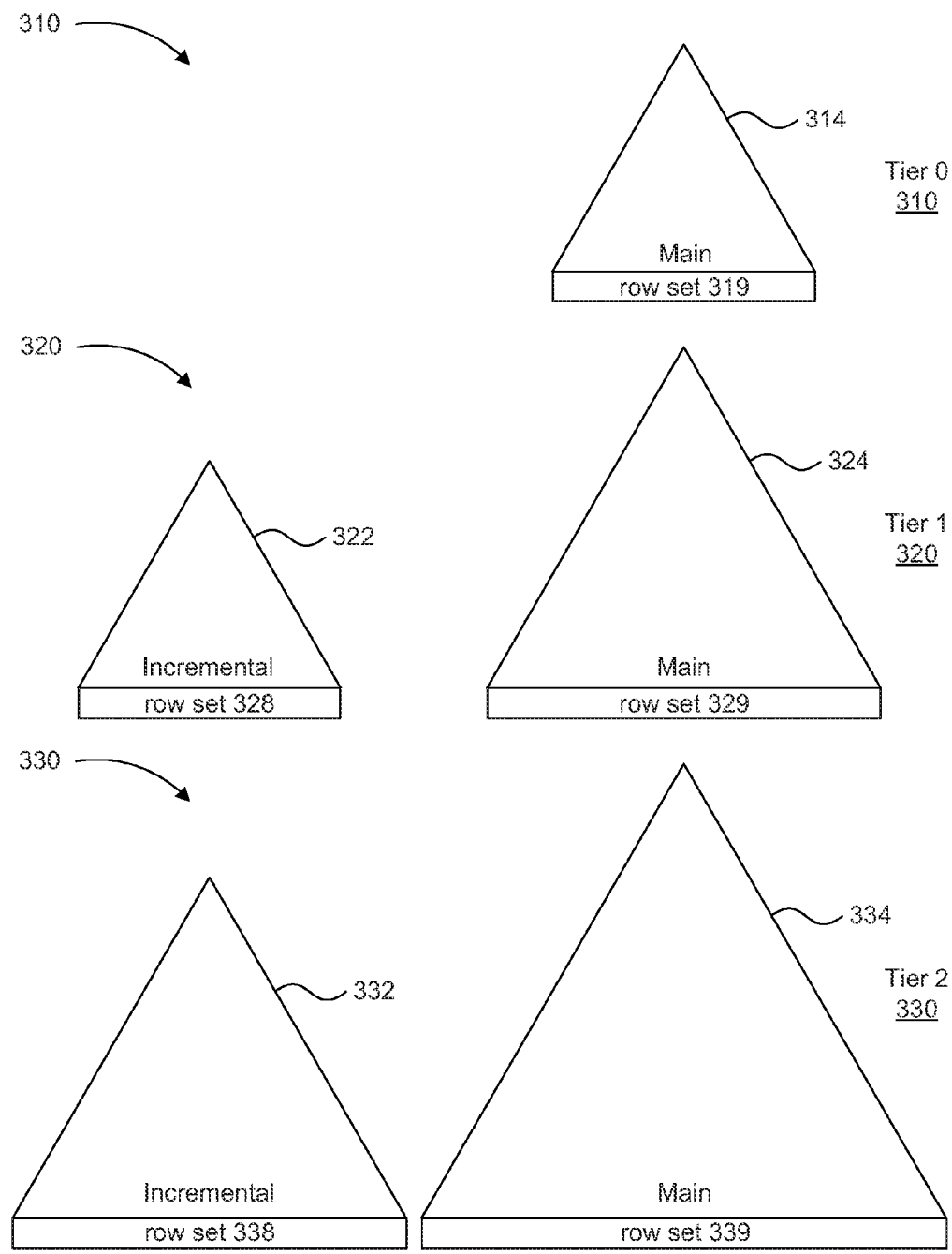
FIG. 3a is a diagram of a sub-index arrangement in a tiered index architecture, according to an example embodiment.

FIG. 3a is a diagram of a sub-index arrangement in a tiered index architecture 300, according to an example embodiment. In the depicted example, tiered index includes a tier 310 (tier0), a tier 320 (tier1) and a tier 330 (tier2). Tier0 contains a main sub-index 314 and a rowset 319. Tier1 contains an incremental sub-index 322, an incremental rowset 328, a main sub-index 324, and a main rowset 329. Tier2 contains an incremental sub-index 332, an incremental rowset 338, a main sub-index 334 and a main rowset 339. In an embodiment, tier0 is defined to not hold an incremental subindex.

Each incremental sub-index and main sub-index includes, for example, a tree of keys and corresponding row space for every entry in it. Tier0 has one sub-index since there is no tier prior to it. Merge module 140 keeps the data in every tier in a consistent state so that all the supported queries can also be performed on all sub-indices including incremental and main sub-indices of each tier.

In order to keep merge cost proportional to insert size over time, merge module 140 can perform merging work on every tier as part of every insert operation into tier0.

Figure 3B:
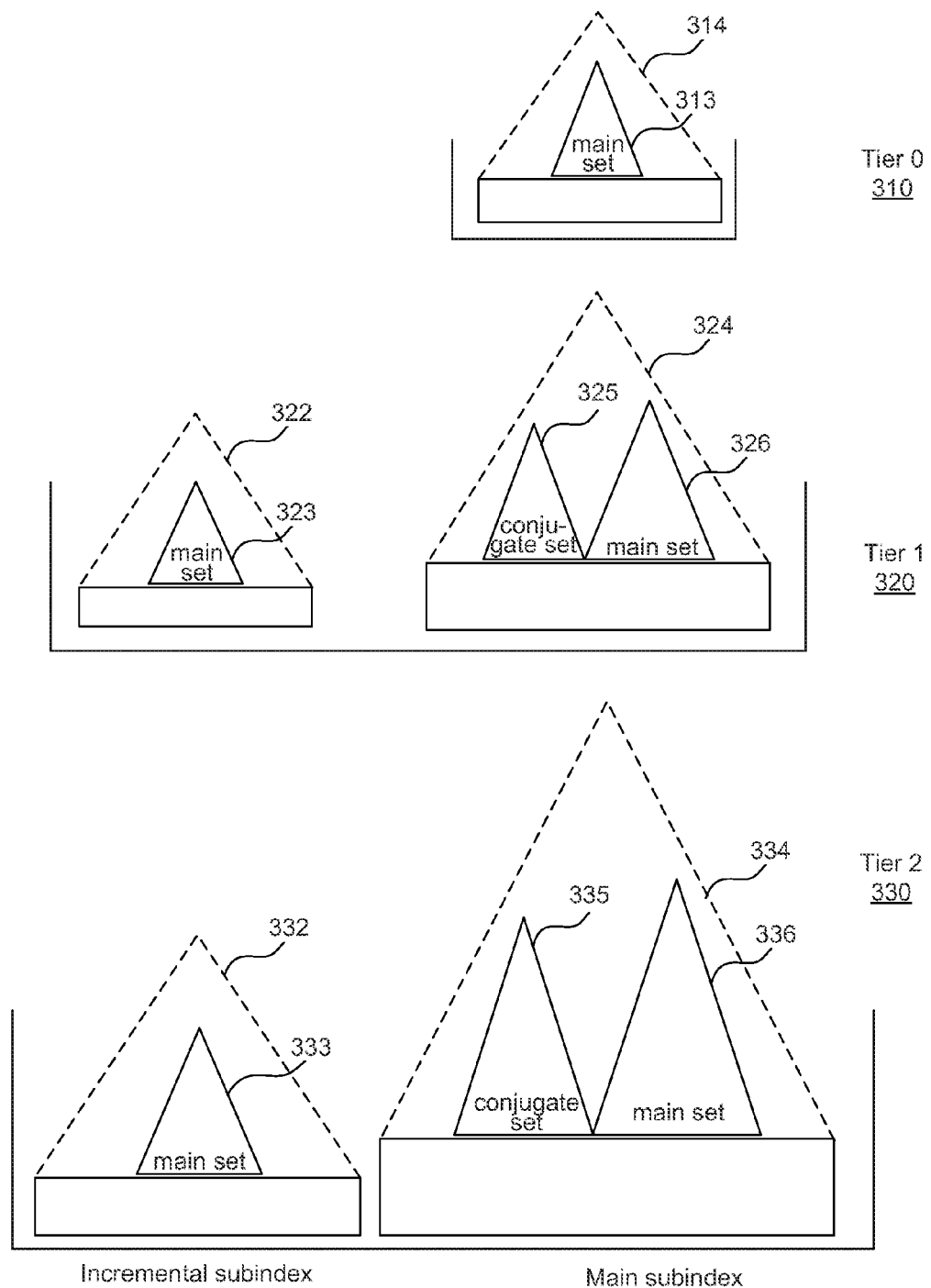
FIG. 3b is a diagram of a sub-index arrangement with sub-index detail in a tiered index architecture, according to an example embodiment.

FIG. 3b is a diagram of a sub-index arrangement with further sub-index details in a tiered index architecture 300, according to an example embodiment.

Sub-index 314 includes a main sorted set of keys 313. Incremental sub-index 322 includes a main sorted set of keys 323. Main sub-index 324 includes a conjugate set of sorted keys 325 and a main sorted set of keys 326. Incremental sub-index 332 includes a main sorted set of keys 333. Main sub-index 334 includes a conjugate set of sorted keys 335 and a main sorted set of keys 336.

In an embodiment, the conjugate set maintains the result of a merge operation between the incremental sub-index and the main sub-index in each tier (except tier0). As part of the merge operation in each tier, keys can be drained from the main set of the incremental sub-index and the main set of the main sub-index and inserted into the conjugate set. This process is further explained in detail below, with reference to FIG. 5.

Figure 4:
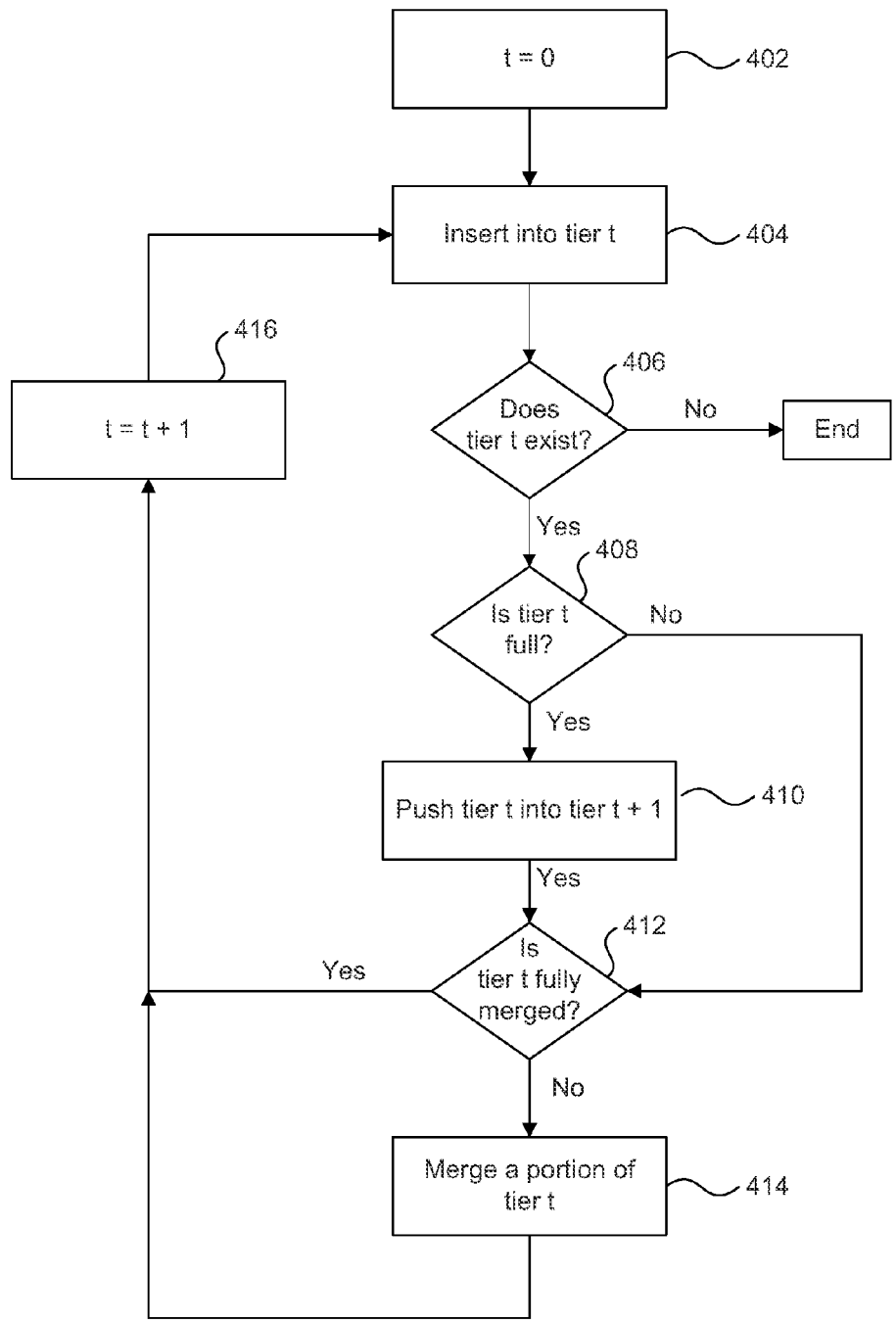
FIG. 4 is a flowchart illustrating a process for inserting data into a tiered index architecture, in accordance with an example embodiment.

FIG. 4 is a flowchart illustrating a process 400 for inserting data into a tiered index architecture, in accordance with an example embodiment. Any step of the process may be performed by one or more of insert module 130, merge module 140 and query module 150.

The process starts by inserting data in tier0 at steps 402 and 404. The process then continues to merge data from the incremental sub-indices into the main sub-indices on the lower tiers. At step 406, the process determines if the next tier exists, and if so moves to step 408. If there is no lower tier, the process ends.

If a lower tier exists, the process verifies whether the tier is full as a result of the insert. If the tier is full, the process pushes the tier into the next tier, as shown at step 410. In this scenario, the process can convert the main sub-index of tier t into the incremental sub-index of tier t+1.

At step 412, the process verifies whether tier t has been fully merged. The process can do this by determine whether there is data in the incremental sub-index of tier t, as shown in step 412. If at step 412 the process determines the incremental index is empty, then there is no data to merge and the process continues to the next tier, as shown in step 416. If there is data in the incremental sub-index, i.e., the sub-indices are not fully merged, the process, at step 414, merges a portion of the incremental sub-index into the main sub-index for tier t. An example process in which this merge can be performed is further described below with reference to FIG. 5.

In an embodiment, merge module 140 completely merges an incremental sub-index into the main sub-index before the previous tier reaches its threshold size. Merge module 140 can perform a complete merge of the incremental and main sub-indices in a tier whenever its previous tier's main sub-index grows over its size threshold. In another embodiment, merge module 140 performs sufficient merging after every insert to ensure that when a tier grows over its threshold size, the next tier is fully merged and has no incremental sub-index.

Figure 5:
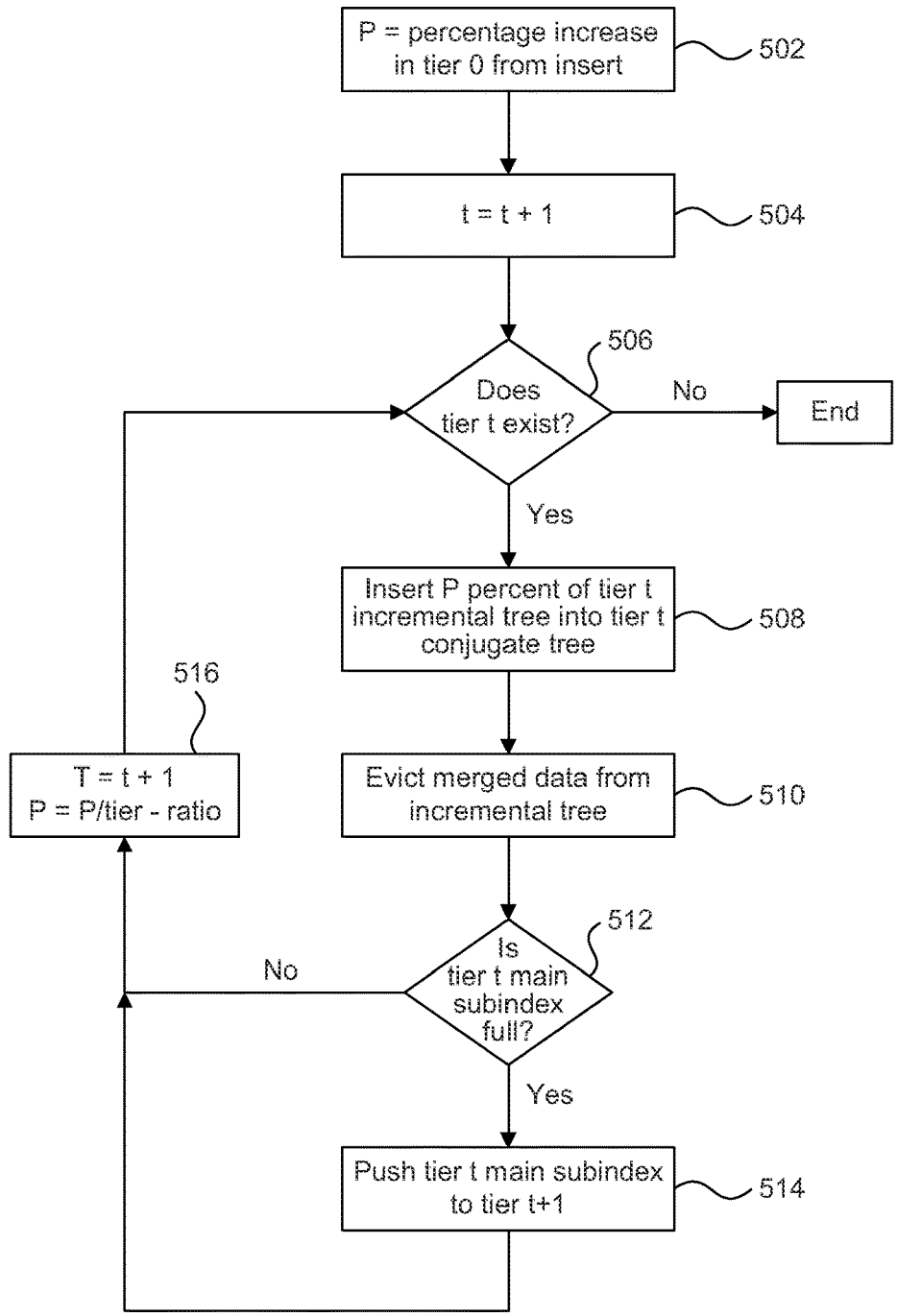
FIG. 5 is a flowchart illustrating a process for merging incremental and main sub-index data in each tier, according to an example embodiment.

FIG. 5 is a flowchart illustrating a process 500 for partially merging incremental and main sub-index data in each tier, according to an example embodiment. Any step of the process may be performed by one or more of insert module 130, merge module 140 and query module 150.

At step 502, the process calculates how much tier0 has been filled by the current insert operation. For example, if 100,000 rows were inserted into tier 0, taking it to 50% full from a 35% full state, then the process sets 15% as the percentage P by which the insert filled tier0.

At step 504, the process moves to the next tier, i.e., tier t, and checks whether the tier exists at step 506. If there are no more tiers, the process ends.

If tier t exists, the process merges P percent of tier t's incremental and main sub-index into a conjugate tree (maintained as a separate merge result tree within the main sub-index) of tier t, at step 508. Using a conjugate tree permits storing an intermediate result of a merge, and allows the process to perform a partial merge on each tier for every insert operation. In an embodiment, at any point in time, the keys in a conjugate tree are always smaller (and thus non-intersecting) than the keys present in the incremental sub-index or in the main tree of the main sub-index. Building a merge result tree separately also affords maintaining lower tiers in densely packed fashion. In an embodiment, the conjugate tree and the main tree together are considered to form the main sub-index. Continuing the previous example, if the percentage increase after an insert in tier0 was 15%, the process would merge the incremental sub-index of tier1 into the main sub-index of tier1 so as to increase by 15% the amount of total rows (incremental and main) that have been merged in the tier.

Doing the merge in this manner ensures that the amount of merging work in lower tiers is proportional to the size of the insert load. If the insert load is small, then a small number of rows need to be merged in lower tiers. If the insert load is large, a larger number of rows need to be merged in lower tiers.

At step 510, the process evicts data that already has been merged from the incremental and the main trees of tier t.

At step 512, the process checks whether the main sub-index of tier t is full, that is, whether it exceeds the threshold size for tier t. If the main sub-index is full, the process moves to step 514 and pushes the main sub-index into tier t+1, and making it the incremental sub-index of tier t+1. Otherwise, the process jumps directly to step 516.

At step 516, the process moves to tier t+1 to perform the merge operation in that tier. The process also divides the percentage P of the next tier to be merged by the tier ratio. Since every lower tiers is bigger than the previous tier by the tier ratio, a lower percentage of each tier needs to be merged. Continuing with the previous example, assume that the tier ratio is 30. If the percentage increase after an insert in tier0 was 15%, the process would perform a 15% merge in tier1 (as explained above at step 508), and then a merge 15/30=0.5% in tier2. Again, doing the merge in this manner ensures that the amount of merging work in lower tiers is proportional to the size of the insert load.

As explained above with reference to step 508, the merging process merges data from the incremental sub-index and main tree from main sub-index into a conjugate tree that forms part of the main sub-index. The merging process involves filling the conjugate tree while dividing the main and incremental trees at the end of every merge to evict data that has already been merged.

To perform a query, a cursor may be defined on each sub-index. For example, for a single key find, the cursor first attempts to find the key in the conjugate tree and if it is not found attempts to find the key in the main tree of the sub-index. In the case of an ordered retrieval or a ranged access, the cursor entirely traverses the conjugate tree before switching to probe the main tree. For efficient work allocation, the cursor can also support an interface to provide the ordinal for a key in the combined set of trees. In an embodiment, if a key with provided ordinal in the main tree is requested, then the ordinal is increased by the total number of keys in the conjugate tree. In an embodiment, both key-to-ordinal and ordinal-to-key interfaces are supported.

The system can improve data deletion by incorporating physical deletes with the merging process described above. In an embodiment, when a delete operation arrives, the system can defer the delete in all non-zero tiers and instead maintain a set of records deleted from every tier. The merge action can ignore all such records when constructing the conjugate tree. For example, during a merge process as described in FIG. 5 above, the process can ignore, and thus not merge, those records that were marked as deleted during a delete operation. In an embodiment, the deletes will eventually be processed completely when the merge reads the entire sub-index after a few loads.

In an embodiment, because delete operations do not immediately remove records, queries will refer to the list of deleted records maintained for every tier, for example, when projecting rows.

The number of distinct keys in a tree is a very useful statistic in a database. Key count metadata can be useful, for example, for optimizers when comparing query plans or deciding which query algorithm to use. In an embodiment, for a non-unique sorted index, system 100 maintains an approximate distinct key count with bound in the tiered index architecture. For a unique sorted index, the distinct key counts are calculated by adding up key counts in individual sub-indices.

In an embodiment, system 100 maintains an estimate of the distinct key count in the index within a bounded range. For example, system 100 can maintain a count with each sub-index for how many keys in the particular sub-index are new or different from the keys in the biggest sub-index. Based on these counts, system 100 can compute a bounded expression for the number of distinct key in the entire index. In an embodiment, this bounded distinct count is integrated into the insert/merge process.

Figure 6:
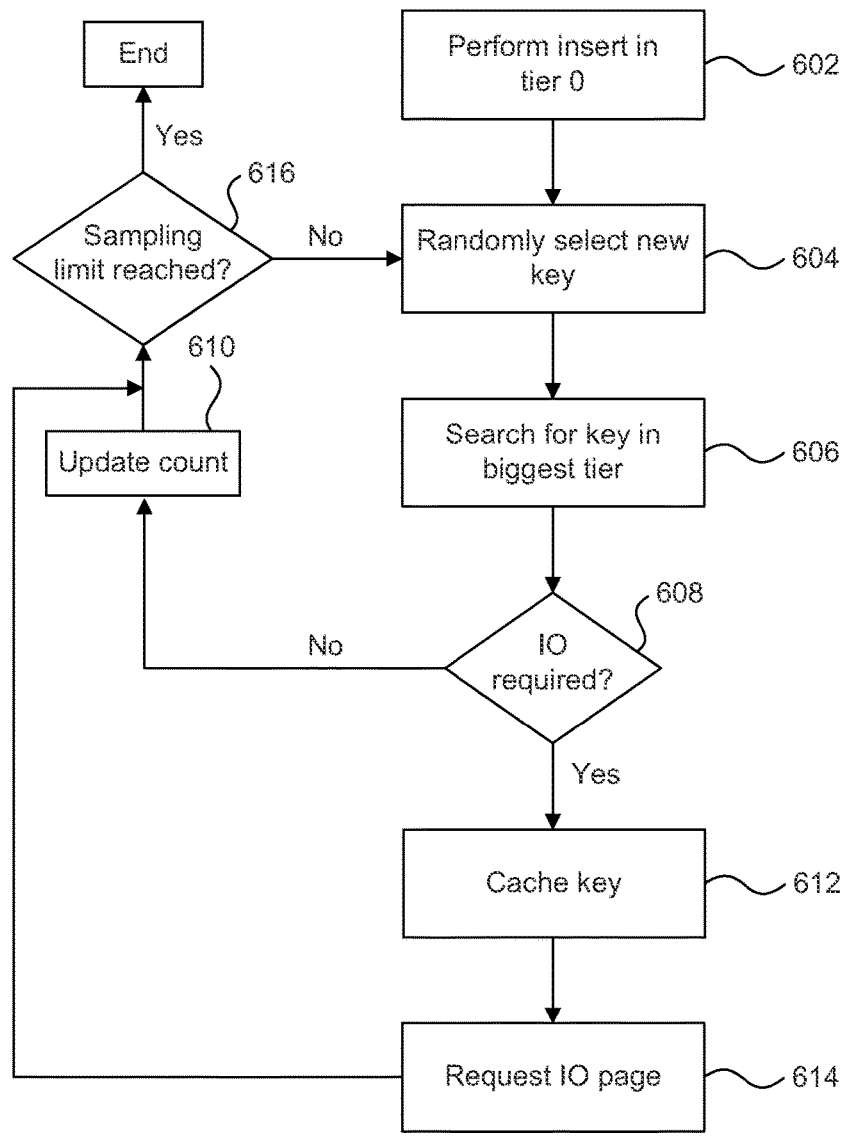
FIG. 6 is a flowchart illustrating a process for computing a bounded distinct count during an insert and merge operation in a tiered index architecture, according to an example embodiment.

FIG. 6 is a flowchart illustrating a process 600 for computing a bounded distinct count metadata during an insert and merge operation in a tiered index architecture, according to an example embodiment.

At step 602, insert module 130 receives an incremental insert load. An incremental load may contain new keys, and these keys may be sparsely located in the biggest tree. Any step of the process may be performed by one or more of insert module 130, merge module 140 and query module 150.

At step 604, the process randomly probes one or more of the keys inserted in tier0, in accordance with an example embodiment. Probing every inserted key might require accessing different pages in the biggest tree, which may incur a very high I/O cost of reading pages from storage and loading them into memory. In an embodiment, the process randomly probes one or more of the inserted keys added to tier0 and begins to search for them in the biggest tier, as shown in step 606.

The process continues to search for the key until an I/O operation is required to continue searching the biggest tier. If, at step 608, the search ends without requiring an I/O operation, the process moves directly to step 610 to update the key count. If the search requires an I/O operation, the process proceeds to cache the key at step 612 and request the I/O page at step 614. Instead of waiting for the I/O operation to retrieve the data, the process can continues with the key insertion. At step 616, the process determines if it has reached the limit of keys to be sampled. If the process has reached the limit, it ends. If the process has not finished, the process moves back to step 604 to probe a new key. If the cache holds the pending key for which an I/O request was initiated, the process can find this I/O page in memory and update the key count. The cache can also be cleared and the process can continue with the current key being inserted.

In an embodiment, process 600 can occur for every insert operation. Once the process samples a given number of keys (as described in step 616) the process ends. The next time insert module 130 receives an insert operation, the process reinitiates and probes a new set of keys.

Process 600 permits probing a few random keys to obtain a bounded estimate of the distinct key count, while keeping I/O delays in check. When coupled with tier0 size restriction, as described above, the impact of randomness can remain restricted within the key ratio among tier0 and the biggest tier.

Additionally, in an embodiment, system 100 can perform a probing when the tier0 sub-index gets pushed into tier1 with each incremental insert load. For example, when performing a merge between the incremental tree and the main sub-index of tier1 as a result of an insert operation (as described with reference to FIG. 5 above), system 100 can probe the merged keys in the biggest tier. In an embodiment, the system performs a bottom-up tree traversal for searching the keys relative from the position last searched. Since there can be a greater likelihood that these keys will appear in same vicinity, this bottom-up traversal may require less number of key comparisons than traditional top-down search. In an embodiment, during this proportional merge, the merged keys are probed in the biggest tier. In an embodiment, the operation is required only for tier 1 alone, since for all other tiers (of bigger size) all the keys are already accounted considering they were pushed from tier1 in the past. In an embodiment, the same process of probing occurs when physically deleting a key from a sub-index, except when there is no further information gain in re-probing these deleted keys. For example, in the case when a sub-index had all keys probed and marked as duplicates or the sub-index had all the keys probed and marked as distinct, the process of probing may be omitted when deleting keys.

As a result of the probing process thus described, each sub-index, except the biggest one, can have a count of the number of keys probed and the number of keys found new. In an embodiment, system 100 uses this information to compute a bounded distinct count. An example of this computation is described below. In an embodiment, for every tier lower than tier1, the number of keys probed is ensured to be equal to the number of keys in the sub-index.

Let, $C_n$ be the number of keys in the lowest (i.e., biggest) sub-index;

$P_i$ be the number of keys probed; and $N_i$ be the number of keys found "new,"

for every other sub-index i.

If a sub-index has less number of keys probed than others, the number can be scaled up, or normalized, using the "keys" to "keys probed" ratio. System 100 can use this metadata to compute an upper bound of the number distinct keys by adding the count of key s in the biggest tree and the number of "new" keys in all other sub-indices:

$$\text{Upper Bound} = C_n + \Sigma N_i$$

Since a key that is "new" in one sub-index can be the same "new" key in another sub-index, the lower bound can be computed as:

$$\text{Lower Bound} = C_n + \text{Max}(N_0, N_0, N_2, \ldots, N_n)$$

In an embodiment, system 100 can compute an approximate distinct count by scaling the "new" keys for a sub-index using the "new keys" to "actual keys" ratio for other sub-indices. This scaling can help correct new key counts for keys that are not present in the biggest tree but are present in other sub-indices.

The division of data among multiple tiers introduces challenges in query execution. In certain embodiments, queries may require searching and aggregating data from multiple tiers. Furthermore, the same data could be present in multiple sub-indexes. However, system 100 can take advantage of the tiered architecture and certain data properties to perform various optimizations to the data retrieval mechanisms.

Figure 7:
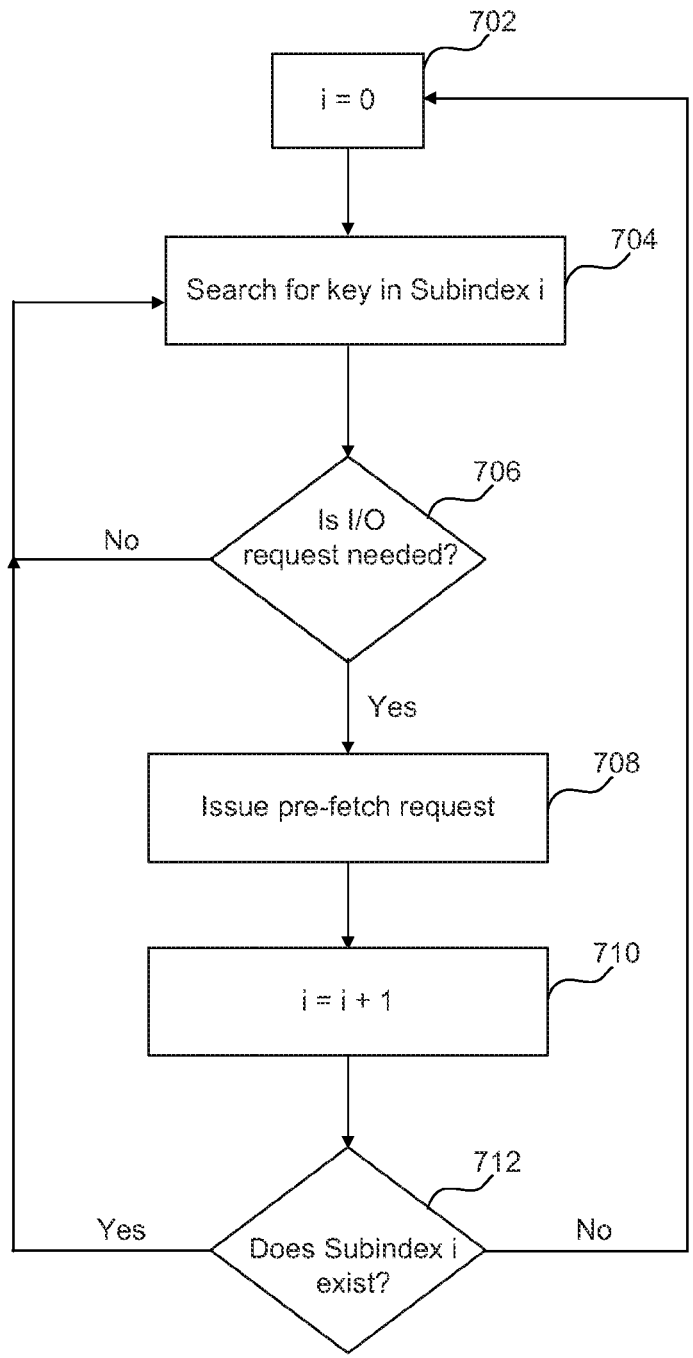
FIG. 7 is a flowchart illustrating a process 700 of retrieving a key with a retry-based mechanism, according to an example embodiment.

FIG. 7 is a flowchart illustrating a process 700 of retrieving a key with a retry-based mechanism, according to an example embodiment. Any step of the process may be performed by one or more of insert module 130, merge module 140 and query module 150.

Finding a key in a tree may require searching in more than one tree node or memory pages. If the key is present in a leaf node, the search will require traversal from root to the leaf node. For a tiered index, the same key could be present in more than one subindex. Thus, the number of pages to access (and I/O requests) increases with the number of sub-indexes. This can lead to high I/O wait time if the pages are not in memory. Process 700 can perform a search while minimizing the time spent waiting for I/O requests.

At step 702, the process begins at a sub-index of a group of sub-indexes to search, e.g., sub-index 0. In an embodiment, the group of sub-indexes consists of all tiers.

At step 704, the process searches the current sub-index for the desired key. For example, the process begins at a root node of the sub-index and traverses down in search for the key.

As described by step 706, the process will continue to traverse the current index for the key until it reaches a node that requires an I/O request to be read. When the process needs an I/O request to continue searching the sub-index, it jumps to step 708.

At step 708, the process issues a pre-fetch (I/O) request for the desired node. However, instead of waiting for the I/O request to be satisfied, the node continues to search for the key in the next sub-index of the group to be searched, as described in step 710. In an embodiment, the process cycles through the sub-indexes, issuing I/O requests and moving to the next sub-index while waiting for the I/O requests to finish.

In an embodiment as described at step 712, if all the sub-indexes have been visited, the process moves back to the first sub-index in the group, to re-visit sub-indexes where I/O requests were issued. The process can continue until all sub-indexes have been searched for the key.

System 100 can then merge the results obtained from each sub-index. When system 100 stem performs a key range search, this merging must take place for a number of keys satisfying the range on a number of sub-indexes. System 100 can use an accumulation methodology to merge these groups in an efficient and scalable manner.

In an embodiment, system 100 divides keys into categories based on the number of records per key. For example, keys can be divided into the groups of: "singleton," "grouplist" (e.g., 64K records/key) and "bitmap" (e.g., greater than 64 records/key). In order to accumulate results, system 100 can allocate a memory region and divide it into several regions, for example: a recid region, a grouplist region and a bitmap region. In an embodiment, the group-list region can be divided into an input and an output region.

In an embodiment, singleton type groups can be stored as a list of recids and group-list groups can be stored as a list of grouplists. If the recid region gets full, system 100 can sort and process it as a grouplist input. If the grouplist input region gets full, system 100 can merge the grouplist to a wide-grouplist on the output region by picking two adjacent grouplists at a time and writing them to the output region. In an embodiment, a wide-grouplist is a prefix compressed in-memory structure where all recids with a common 4-byte prefix are placed together.

When all group-lists have been merged into wide-grouplists on the output region, system 100 can switch the input and output regions and continues merging wide-grouplists in the same manner. They system can continue merging in the same manner until only two wide-grouplists are remaining. The two wide-grouplists can be merged to create a persistent bitmap structure. System 100 can continue to merge groups to create persistent bitmaps until a sufficient number of bitmaps is reached, or there are no further groups to merge. At this point, system 100 can merge two bitmaps at a time in a binary tree-wise merge to construct a final result bitmap.

Figure 8A:
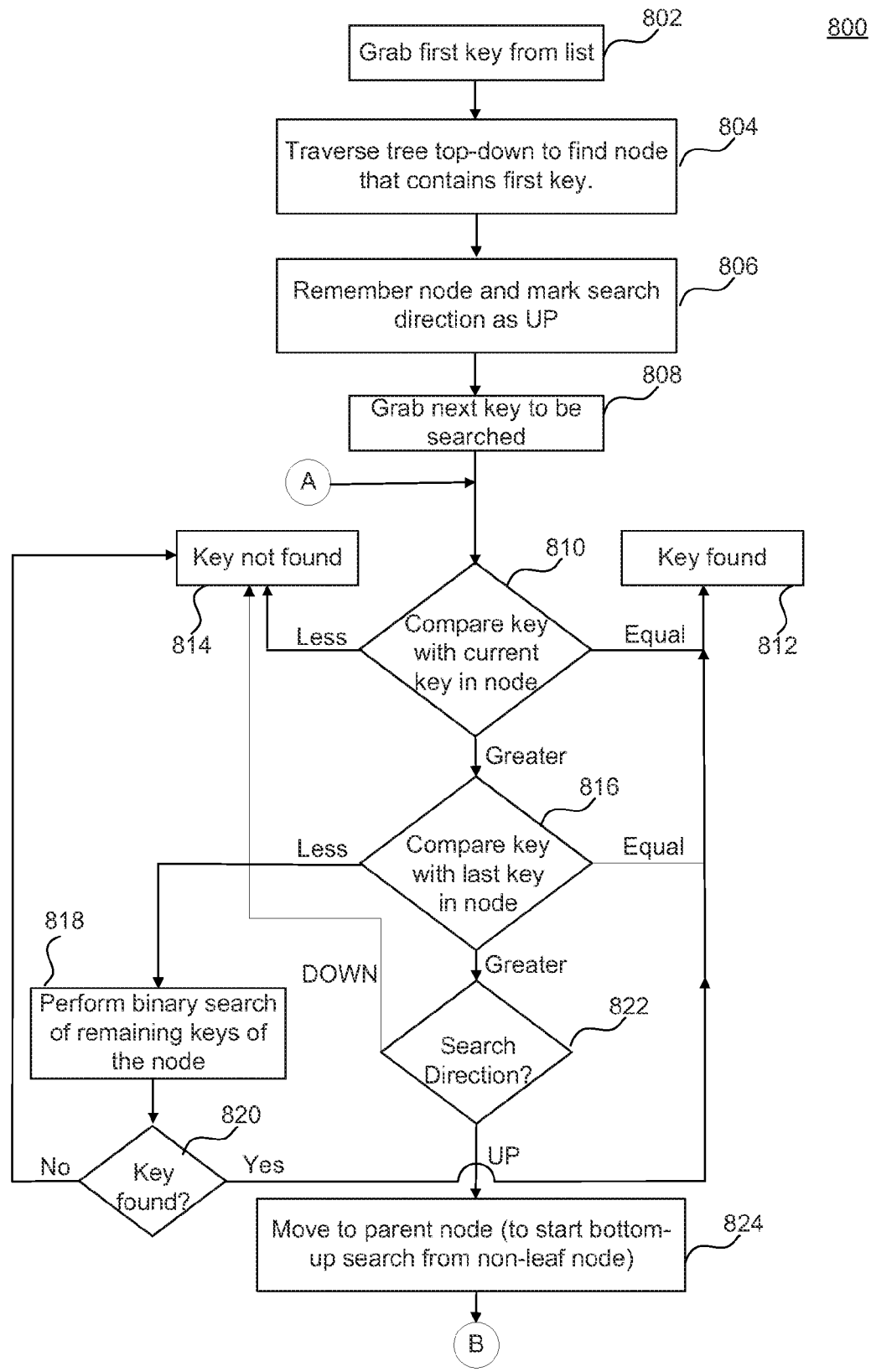
FIGS. 8A-C depict a flowchart illustrating a process 800 for finding a key in a tree using a bottom-up key-relative search, according to an example embodiment.
Figure 8B:
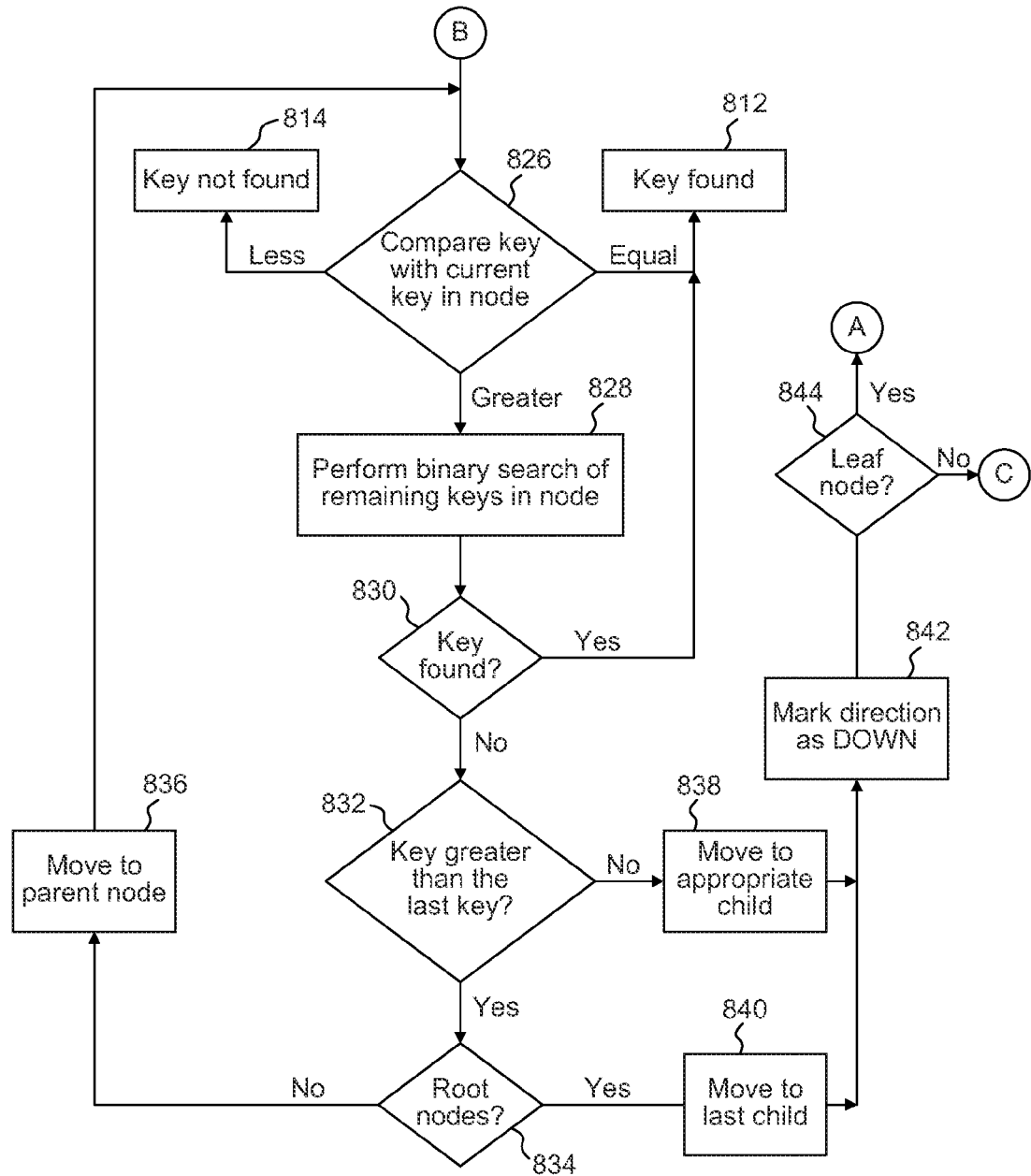
Figure 8C:
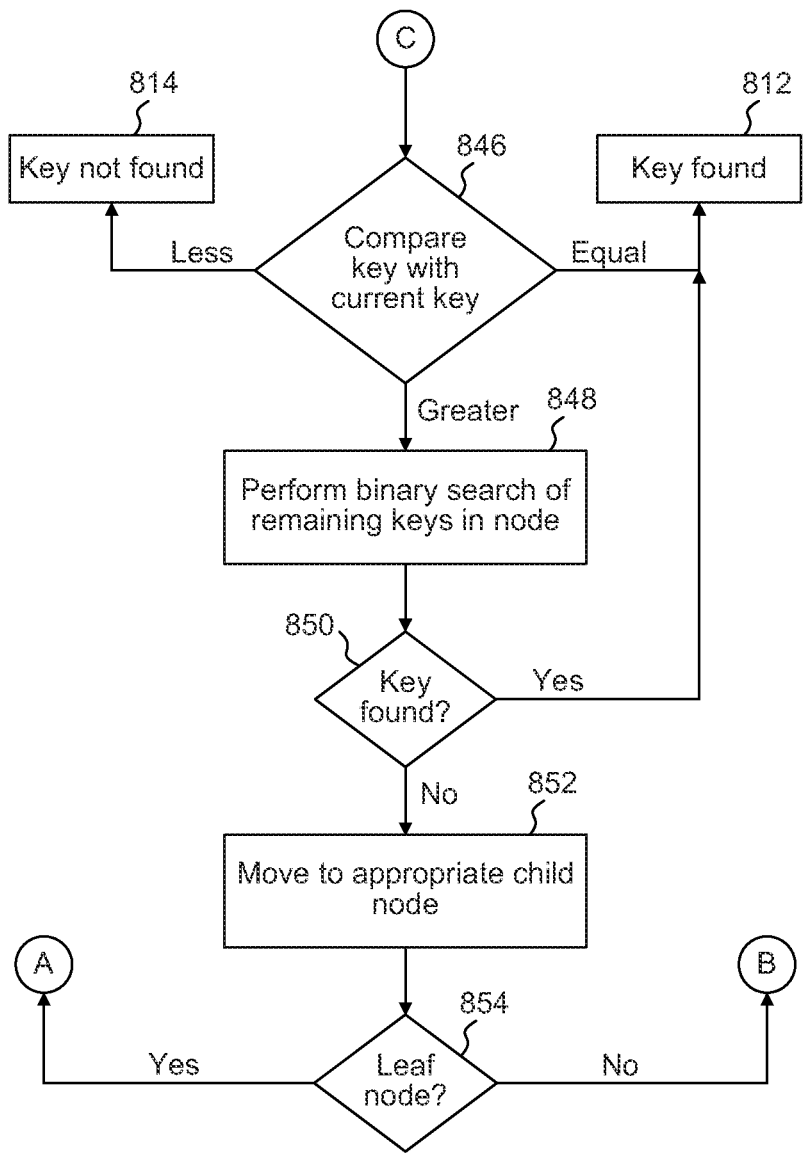

FIGS. 8A-8C depict a flowchart illustrating a process 800 for finding a key in a tree using a bottom-up key-relative search, according to an example embodiment. Any step of the process may be performed by one or more of the insert module 130, the merge module 140 and the query module 150.

When searching for a key in a top-down fashion, such as a binary search, the search may require up to log(n) key comparisons, where n is the number of keys in the tree node. If the key exists in a leaf node, then up to d*log(n) comparisons might be needed, where d is the depth of the tree.

If a sorted list of keys to search in a tree is dense (or large), then the probability of the keys being on the same or an adjacent node is high. In such a scenario, a bottom-up key-relative search, as described by way of example in FIG. 8, can result in reducing the number of key comparisons.

As shown in FIG. 8A, at step 802, the process grabs a first key to search, for example, from a list of keys to search.

The process moves to step 804, and traverses the tree in top-down fashion in search for the node that contains the key.

As shown in step 806, the process remembers the node where the key was either found (or the last node the key was searched for). If the search ended on a non-leaf node, then we additionally reset all the below levels to leftmost child of the parent node. When searching for a new key, the process marks the search direction as UP and then continues to search in a bottom-up fashion from the leaf node.

At step 808, the process grabs a new key to be searched, and continues from the node and position where the previous key search ended. The process moves to step 810 to initiate a bottom-up search from the leaf node.

At step 810 the process compares the key with the current key in the current node. If the keys are equal, the process has found the key, as depicted in step 812.

If at step 810 the key is found to be less than the current key in the node, the process determines the key is not present, as depicted in step 814.

If at step 810 the key is found to be greater than the current key in the node, the process moves to the last key in the node, as depicted in step 816. At step 816, the process compares the key to the last key in the node. If the keys are equal, the process determines the key has been found. If the key is less than the last key in the node, the process moves to step 818. At step 818, the process performs a binary search for the key in remaining keys in the current node. If the binary search yields the key, the process ends, as shown in step 820. If the key is not found, the process moves to step 814 and if it is found, the process moves to step 812.

If at step 816 the key is greater than the last key in the node, the process moves to step 822. If the search direction is DOWN, the process determines the key does not exist in the tree and that all subsequent keys will also be greater than the maximum key in the tree. If the search direction is UP, the process moves to the parent node to continue the bottom up search from a non-leaf node, as described in FIG. 8B.

As shown in FIG. 8B, at step 826 the process compares the key with the current key in the parent node. If the key is equal to the current key, then the key has been found. If the key is less than the current key, the process determines the key is not found. If the key is greater than the current key, the process proceeds to step 828 and performs a binary search for the key in the remaining keys in the current node.

If the binary search yields the key, the process ends, as shown in step 830. If the key is not found, the process moves to step 832 and determines whether the key is greater than the last key in the current node. If the key is greater than the last key and the node is not a root node, the process moves to the parent node and continues the bottom-up search from the parent node, as shown in steps 834 and 836.

If at step 832 the process determines the key is less than the last key, the process moves to the appropriate child node to perform a top-down search, as shown in steps 838 and 842. If the child node is a leaf node, the top-down search proceeds by moving to step 810, as shown in FIG. 8A and explained above. Otherwise, the top-down search proceeds by moving to step 846, as shown in FIG. 8C and explained below.

If at step 834 the node is determined to be a root node, the process moves to the last child node to perform a top-down search, as shown in steps 840 and 842. If the node is a leaf node, the top-down search proceeds by moving to step 810, as shown in FIG. 8A and explained above. Otherwise, the top-down search proceeds by moving to step 846, as shown in FIG. 8C and explained below.

As shown in FIG. 8C, at step 846 the process compares the key with the current key. If the key is equal to the current key, then the key has been found. If the key is less than the current key, the process determines the key is not found. If the key is greater than the current key, the process proceeds to step 848 and performs a binary search for the key in the remaining keys in the current node.

If the binary search yields the key, the process ends, as shown in step 850. Otherwise, the process moves to the appropriate child node to continue the top-down search, as shown in step 852. If the child node is a leaf node, the process proceeds by moving to step 810, as shown in FIG. 8A as explained above. Otherwise, the process proceeds by moving to step 826, as shown in FIG. 8B and explained above.

In this manner, the process traverses the tree in a bottom-up fashion that can be beneficial in certain scenarios. In tiered index architecture, system 100 can probe keys in ascending order from mid tiers against the base (largest) tier, which may contain most of the keys. If the base tier has all the keys, then one key comparison may be sufficient to determine that the key probed is already present.

It should be noted that although this bottom-up key-relative tree traversal approach can be beneficial to achieve distinct count maintenance for a tiered index architecture, the process is not limited to this scenario. For example, the approach can be beneficial for dense in-list or subquery execution in general, where keys may be co-located in a B-tree. In this scenario, just one key comparison may be sufficient to determine that a key is present in the B-tree, for each input key.

The approach can also be beneficial for unique constraint enforcement. For example, for a column with a unique constraint, most of the input data will be unique. The approach can be used to verify the uniqueness of the input keys. If the input keys are co-located, just one key comparison may be sufficient to determine that the input key is not already present.

Ordered access of underlying data is a commonly used operation in database query execution, and is also one of the most processing intensive. The efficiency of ordered retrieval generally depends on the sorting mechanism. For data that has been pre-sorted into N sorted sets, ordered retrieval would require an efficient mechanism for merging these sets.

In tiered index architectures, as described herein, data can be divided into sets based on the age of the data. For example, certain data characteristics may define a natural ordering, such as timestamps. In other example scenarios, there may be pockets within each set in which data may already be in global sort order or which need not be merged or compared with all other sub-indices.

In an embodiment, an approach for ordered access in a tiered tree architecture can minimize the overall number of key comparisons and can detect or leverage upon the above-mentioned data characteristics.

If data is stored in N trees, it may take up to N−1 key comparisons per key for ordered traversal. Thus, requiring K*(N−1) comparisons for a total of K keys. The number key comparisons can be reduced to log(N−1) for each key retrieved by using any tree based sorting method, like multi-way merge and replacement selection, as will be understood by those skilled in the relevant arts. In an embodiment, system 100 can use a loser replacement selection tree.

Figure 9:
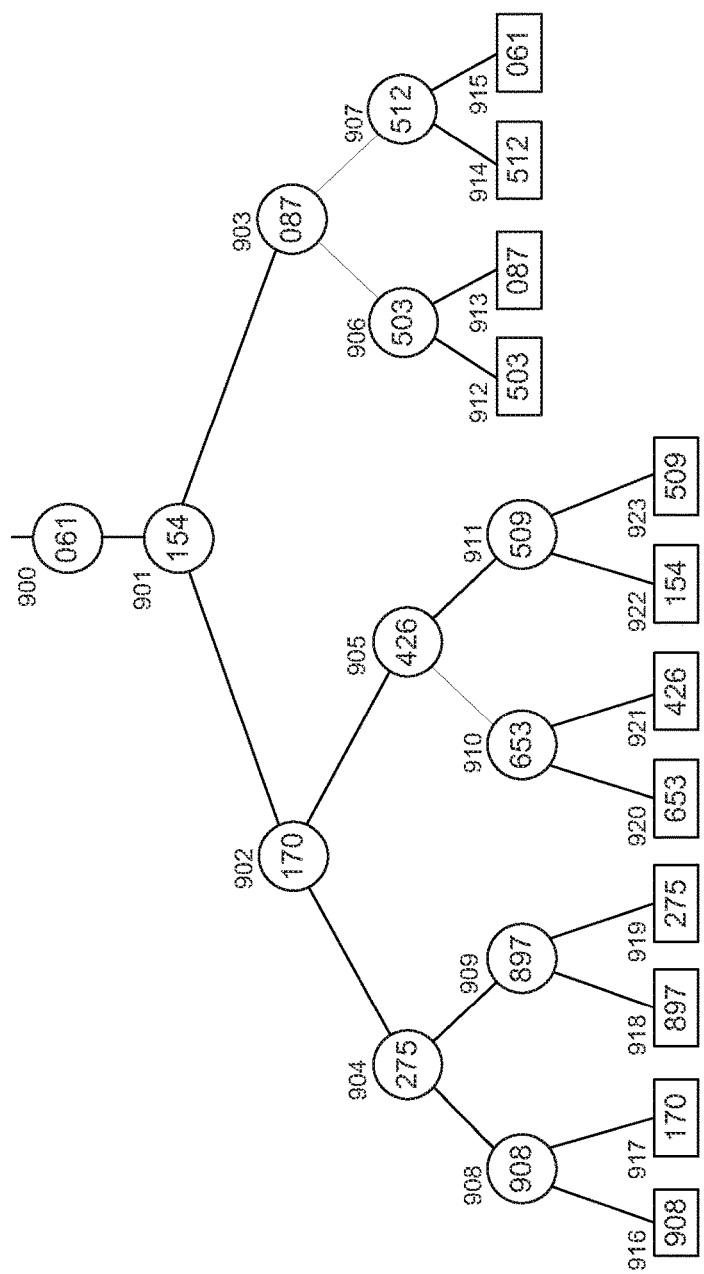
FIG. 9 depicts a loser selection tree that can be used to perform efficient ordered retrieval, according to an example embodiment.

FIG. 9 depicts an example of a loser selection tree that can be used to perform efficient ordered retrieval, according to an example embodiment. This example tree is excerpted from D. Knuth, *The Art of Computer Programming*, Volume 3, Section 5.4.1.

The depicted exemplary loser selection tree contains nodes 900-923. In an embodiment, every internal node in a loser selection tree represents the loser of a tournament match between the external (leaf) nodes. For example, nodes 908 and 909 contain the losers (greater keys) of their corresponding child nodes. These keys, i.e., 908 and 897, are eliminated from the tournament. Node 904 contains the loser (275) of the match between the remaining keys in the segment, i.e., keys 170 and 275. The head of the tree, node 900, contains the winner of the tournament, i.e., 061. In embodiments, the loser selection tree can be created using techniques known to those skilled in the relevant arts, for example, using algorithms as described in Section 5.4.1 of D. Knuth, *The Art of Computer Programming*, Volume 3, this section being hereby incorporated by reference. However, such embodiments are not limited to these examples.

Efficient retrieval ordered retrieval may be performed by one or more of insert module 130, merge module 140 and query module 150. In an embodiment, system 100 creates a loser selection tree, where every node in the tree represents one distinct btree belonging to a tier. In an embodiment, every b-tree tree contains pre-sorted data. System 100 can use the selection tree to find the next tree in an ordered retrieval of keys. Using a selection tree can require an additional log(N−1) key comparisons per key retrieval. However, one can compute the runner-up key (silver-medalist) with an additional log(N−2) comparisons. This can require comparison of the highest loser in the selection tree with every other loser which has been compared with the champion record. If the next winner continues to come from the same set, the selection tree does not need to be changed, also the runner-up key remains the same, thus saving log (N−1) comparisons. In an embodiment, system 100 needs a single key comparison against the silver-medalist when the next winner key can be retrieved from the same set.

Once the smallest (champion) data tree has been traversed, it can be evicted from the selection tree. System 100 can compare the next record in the selection tree segment containing the champion key (in the FIG. 9 example, segment with parent node 907) against the pre-computed silver-medalist, to determine the next champion. When the next record in this champion segment is also the same champion, a single key comparison can be sufficient to find the new champion key.

When the segments have data such that they are already presorted among themselves, only one comparison is required to determine the next champion until the entire segment is drained. However, if the segments are not pre-sorted themselves, then computing the next silver medalist can take log(n) comparisons, where n is the number of keys in the segment. Therefore, for completely unsorted segments, the cost can be 2*log(n), the first log(n) for calculating the champion and the second one for calculating the silver-medalist.

In an embodiment, system 100 switches between computing and not computing the silver-medalist based on the data characteristics. As explained above, computing the silver-medalist can yield performance improvements when the current champion segment is chosen as the new champion. In order for the silver-medalist computation to pay off, this condition must occur enough times to offset the cost of the pre-computation. The threshold of times the next element in the current champion segment is chosen as the new champion must occur can be determined to be log(n)/(2*log(n)−1).

In an embodiment, system 100 maintains a measure of the success of computing the silver-medalist. For example, system 100 can measure a window size (e.g., 100). If there are x keys that were found to be champion keys from the same segments, then there is an x % success rate of using the silver-medalist computation. System 100 can compare x against a threshold, and if it's smaller than the threshold, system 100 does not continue to compute the silver-medalist. Otherwise, it continues to do so. In an embodiment, the window size used to measure the success of the silver-medalist computation is increased periodically, (e.g., it is doubled every time there's a switch between performing or not performing the computation), in order to avoid toggling between the two optimizations indefinitely.

This process can prove to be efficient for ordered retrieval in a tiered index architecture and has various applications, such as count of distinct values, finding min/max key, and group-by executions.

Under this approach, if the sorted sets are already in correct sort order, then the total number of key comparisons required can be close to K (i.e., one per key), with K being the total number of keys.

It will be understood by those skilled in the relevant arts that application of a selection (loser's) tree with adaptive silver-medalist computation for ordered retrieval can be beneficial not only for tiered indices, but for N sorted sets in general. This approach can reduce the number of key comparisons. In a worst case scenario, if none of the silver-medalist computations help, the ordered traversal may require up to K*log(N)+log(K)*log(N) key comparisons.

Figure 10:
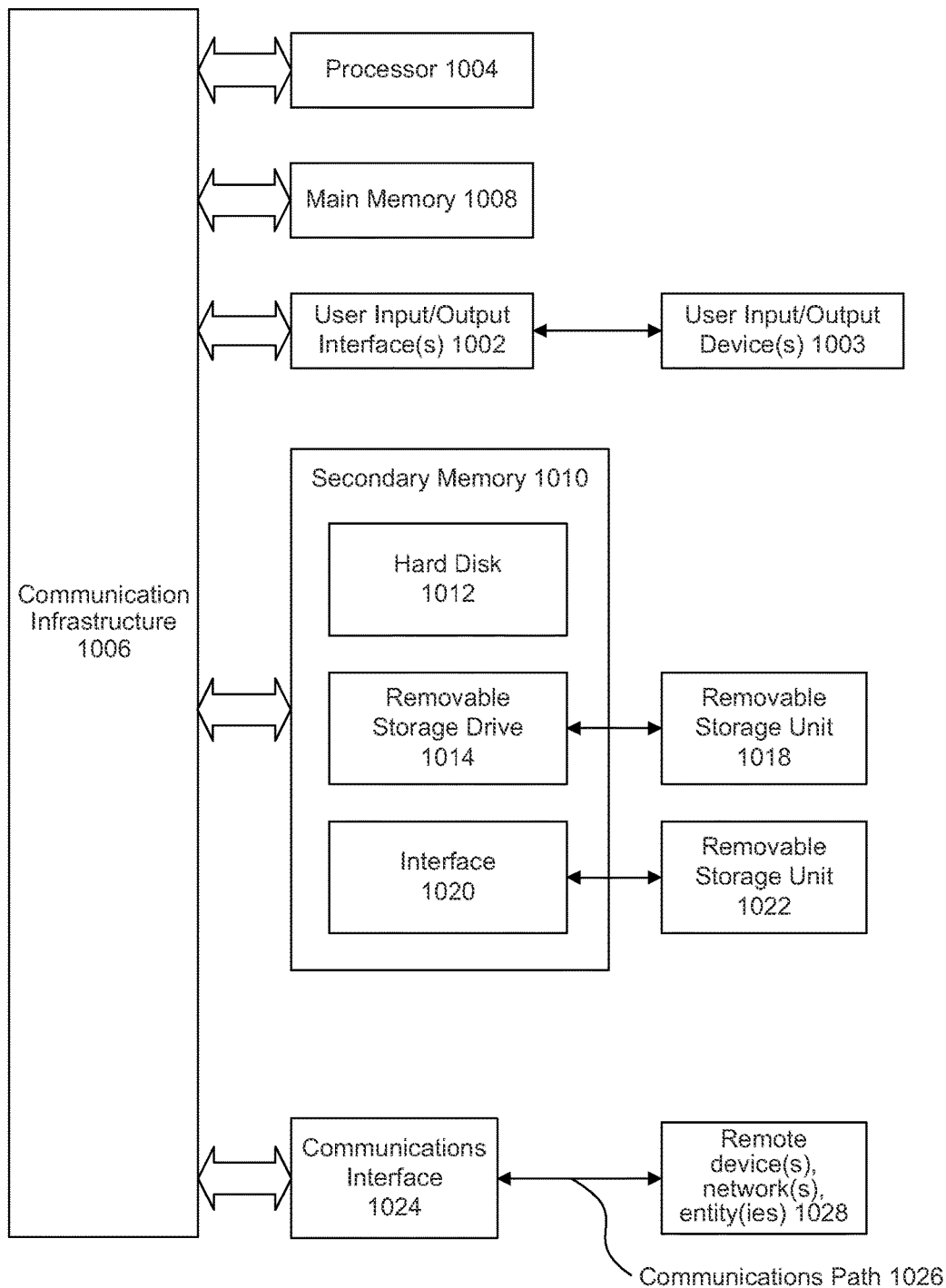
FIG. 10 is an example computer system useful for implementing various embodiments.

Various embodiments can be implemented, for example, using one or more well-known computer systems, such as computer system 1000 shown in FIG. 10. Computer system 1000 can be any well-known computer capable of performing the functions described herein, such as computers available from International Business Machines, Apple, Sun, HP, Dell, Sony, Toshiba, etc.

Computer system 1000 includes one or more processors (also called central processing units, or CPUs), such as a processor 1004. Processor 1004 is connected to a communication infrastructure or bus 1006.

Computer system 1000 also includes user input/output device(s) 1003, such as monitors, keyboards, pointing devices, etc., which communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In an embodiment, a tangible apparatus or article of manufacture comprising a tangible computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 10. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for retrieving data from a database, comprising:
   receiving, by at least one processor, an insert load, wherein the insert load comprises a first key and a second key;
   performing, by the at least one processor, a first traversal of a sub-index of a tier of a tiered index to find the first key in an entry of the sub-index, wherein the tiered index comprises a plurality of tiers;
   dynamically tuning, by the at least one processor, sizing parameters of at least one tier of the plurality of tiers, in response to learning, by the at least one processor, usage patterns of the at least one tier of the plurality of tiers, wherein the dynamically tuning the sizing parameters of the at least one tier of the plurality of tiers comprises limiting a size of the at least one tier of the plurality of tiers to fit entirely in prefetch memory, wherein the limiting the size of the at least one tier of the plurality of tiers to fit entirely in the prefetch memory comprises moving at least one data entry to a lower tier of the plurality of tiers upon determining that a condition has been met;
   determining, by the at least one processor, that the first traversal requires a storage access request, wherein the determining comprises:
      issuing, by the at least one processor, the storage access request,
      caching, by the at least one processor, the first key, and
      performing, by the at least one processor, a second traversal of the sub-index to find the second key before the storage access request has been completed;
   comparing, by the at least one processor, a number of keys searched to a threshold value, wherein the number of keys searched depends at least in part on the dynamically tuning the sizing parameters of the at least one tier of the plurality of tiers;
   updating, by the at least one processor, a distinct key count when the storage access request has been completed, wherein the distinct key count represents a number of distinct keys within a data structure; and
   selecting, by the at least one processor, a query plan to execute a query based upon the distinct key count.

2. The method of claim 1, further comprising:
   returning to search for the first key in the sub-index after the storage access request has completed.

3. The method of claim 2, further comprising merging results of the search from multiple sub-indices of the tiered index after the storage access request has completed.

4. The method of claim 1, wherein the tiered index comprises a group of sub-indices.

5. The method of claim 4, wherein the group of sub-indices comprises a plurality of tiers of the tiered index.

6. The method of claim 4, further comprising:
   determining, by the at least one processor, that all sub-indices in the group of sub-indices have been searched.

7. The method of claim 1, further comprising:
   executing, by at least one processor, the selected query plan.

8. The method of claim 1, wherein the condition comprises at least one of whether a predetermined period of time has lapsed and whether a predetermined number of data inserts has been reached.

9. A computer implemented method for retrieving data from a database, comprising:
   traversing, by at least one processor, a tree of a tiered index in a top-down direction to find a first key, wherein the tiered index comprises a plurality of tiers;
   determining, by the at least one processor, that the first key has been found in a first tree node, wherein determining that the first key has been found in the first tree node comprises storing a position of the first tree node;
   dynamically tuning, by the at least one processor, sizing parameters of at least one tier of the plurality of tiers, in response to learning, by the at least one processor, usage patterns of the at least one tier of the plurality of tiers, wherein the dynamically tuning the sizing parameters of the at least one tier of the plurality of tiers comprises limiting a size of the at least one tier of the plurality of tiers to fit entirely in prefetch memory, wherein the limiting the size of the at least one tier of the plurality of tiers to fit entirely in the prefetch memory comprises moving at least one data entry to a lower tier of the plurality of tiers upon determining that a condition has been met;

updating, by the at least one processor, a distinct key count when the first key has been found, wherein the distinct key count represents a number of distinct keys within the tree;

traversing, by the at least one processor, the tree in a bottom-up direction to find a second key starting at the position of the first tree node;

selecting, by the at least one processor, a query plan to execute a query based upon the distinct key count; and executing, by the at least one processor, the selected query plan.

10. The method of claim 9, the traversing the tree in the bottom-up direction further comprising:

comparing the second key with a current key in a current node, the current node being the node where the first key was found.

11. The method of claim 10, further comprising:

performing a next comparison of the second key with a next key as a result of the second key being greater than the current key.

12. The method of claim 11, further comprising:

performing a last comparison of the second key with a last key as a result of the second key being greater than the next key.

13. The method of claim 10, the traversing the tree in the bottom-up direction further comprising:

performing a binary search for the second key in a set of remaining keys in the current node, the remaining keys being keys between a next key and a last key, as a result of the second key not being equal to the last key.

14. The method of claim 13, the performing the search for the second key further comprising performing a traversal of at least one conjugate tree before probing a main tree of the sub-index.

15. The method of claim 13, the traversing the tree in the bottom-up direction further comprising:

traversing the tree in the bottom-up direction from a parent node to the current node, as a result of the second key not being found in the remaining keys.

16. The method of claim 10, further comprising:

performing a next comparison of the second key with a next key, the next key being adjacent to the current key in the current node, as a result of the second key not being equal to the current key.

17. The method of claim 16, further comprising:

performing a next comparison of the second key with a last key, the last key being in a last position of the current node, as a result of the second key not being equal to the next key.

18. The method of claim 9, wherein the condition comprises at least one of whether a predetermined period of time has lapsed and whether a predetermined number of data inserts has been reached.

* * * * *